(12) United States Patent
Wuest et al.

(10) Patent No.: US 12,530,280 B2
(45) Date of Patent: Jan. 20, 2026

(54) SYNTHETIC TEST DATA GENERATION USING GENERATIVE ARTIFICIAL INTELLIGENCE

(71) Applicant: Acronis International GmbH, Schaffhausen (CH)

(72) Inventors: Candid Wuest, Bassersdorf (CH); Serg Bell, Costa del Sol (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 192 days.

(21) Appl. No.: 18/470,234

(22) Filed: Sep. 19, 2023

(65) Prior Publication Data

US 2025/0094325 A1    Mar. 20, 2025

(51) Int. Cl.
*G06F 11/3668* (2025.01)

(52) U.S. Cl.
CPC ...... *G06F 11/3684* (2013.01); *G06F 11/3688* (2013.01); *G06F 11/3692* (2013.01)

(58) Field of Classification Search
None
See application file for complete search history.

(56) References Cited

U.S. PATENT DOCUMENTS

| | | | |
|---|---|---|---|
| 11,508,360 B2 | 11/2022 | Peng et al. | |
| 11,509,674 B1 | 11/2022 | Beauchesne et al. | |
| 11,544,406 B2 | 1/2023 | Edge et al. | |
| 11,561,875 B2 | 1/2023 | Yakushkin et al. | |
| 11,562,252 B2 | 1/2023 | Walters et al. | |
| 11,675,817 B1 | 6/2023 | Pratik et al. | |
| 11,983,099 B1* | 5/2024 | Gottesman | G06F 11/3688 |
| 2007/0079189 A1* | 4/2007 | Jibbe | G06F 30/00 714/724 |
| 2020/0213018 A1* | 7/2020 | Qi | H04B 17/15 |
| 2021/0049455 A1 | 2/2021 | Kursun | |
| 2022/0068492 A1* | 3/2022 | Friedmann | G16H 10/60 |
| 2022/0100640 A1* | 3/2022 | Shevach | G06F 11/3676 |
| 2022/0156168 A1* | 5/2022 | Panikkar | G06F 11/277 |
| 2023/0030064 A1* | 2/2023 | Adib | G16H 50/20 |
| 2024/0095151 A1* | 3/2024 | Ramakrishnan | G06F 11/3676 |
| 2024/0370357 A1* | 11/2024 | Aurongzeb | G06F 11/3688 |
| 2025/0077396 A1* | 3/2025 | Sen | G06F 11/3698 |
| 2025/0077400 A1* | 3/2025 | Sen | G06F 11/3698 |
| 2025/0085936 A1* | 3/2025 | Guttridge | G06F 8/35 |

* cited by examiner

*Primary Examiner* — Toan H Vu
(74) *Attorney, Agent, or Firm* — ESPE Legal Consultancy FZ-LLC

(57) ABSTRACT

Systems and methods for generating synthetic test data for testing a software solution. Systems and methods include receiving a testing task from a user, identifying test properties of the testing task, gathering initial information based on the test properties of the testing task, forming a training dataset based on the initial information and the test properties, pretraining a generative AI model based on a large language model (LLM) using the training dataset, configuring synthetic test data based on the test properties, and generating synthetic test data according to the testing task using the generative AI model.

20 Claims, 3 Drawing Sheets

SYNTHETIC TEST DATA GENERATION USING GENERATIVE ARTIFICIAL INTELLIGENCE

TECHNICAL FIELD

The present disclosure relates to the field of software testing. More specifically, the present disclosure relates to the generation of synthetic test data using generative artificial intelligence (AI) models, particularly for the testing of software solutions in computing systems.

BACKGROUND

Testing software is an integral part of software development and deployment processes. During testing, the software is often exposed to a variety of data to ensure its proper functionality, performance, and security. The data used for testing purposes can range from real-world data to artificially generated synthetic data. Synthetic testing data refers to artificially generated data that mimics real-world data. It is commonly used to validate the functionality and performance of software applications, especially when actual data is inaccessible, sensitive, or limited. As technologies evolve, the need for quality assurance and testing of new applications grows. Accordingly, synthetic testing data has emerged as a crucial component in the software development lifecycle. Synthetic data is particularly useful for simulating different scenarios, maintaining user privacy, regulatory compliance, machine learning model training, and other testing requirements.

Whether rolling out new solutions in a corporate setting, experimenting with algorithms in research, or consistently evaluating active systems, the right data is indispensable for testing. This holds true across various software types, from Endpoint Detection and Response (EDR) systems and email filters to network monitoring tools, observability tools, Security Information and Event Management (SIEM) systems, Intrusion Prevention Systems (IPS), and Internet of Things (IoT) device identification. Several use cases underscore the importance of generation of right testing data.

In one usage, the right data ensures correct operation. By using synthetic data, developers can replicate numerous situations, from everyday usage to rare outliers and potential errors. This includes tasks like fuzzing and verifying standard functionalities. In one usage, the right data can assess system robustness correctly. To ascertain if a system can withstand real-world pressures, the system is subjected to synthetic data-driven stress tests. This gauges the system's response under intense activity. In another example, the right data is useful for safeguarding sensitive data. Real testing data can inadvertently reveal classified details unless it's properly anonymized. Synthetic data sidesteps this pitfall because it is fabricated, being devoid of authentic personal or confidential details. Right testing data also ensures comprehensive testing. Genuine data might not account for all scenarios, especially uncommon yet crucial events like specific cyber threats. Synthetic data can recreate such events for testing for example using an instance as the simulation of phishing emails. Further, synthetic data offers developers complete command over such data—from its scale and diversity to its pace and accuracy. This ensures focused and consistent testing. Additionally, certain sectors set out rigorous rules for real data usage. Leveraging synthetic data bypasses these constraints, as it is devoid of actual personal details. In yet another usage example, the testing data can be used for training AI models. Tools powered by AI, like some EDRs, can utilize synthetic data for training their machine learning algorithms when genuine data falls short or is off-limits. Synthetic data can also serve as a benchmark to ascertain that operational systems remain functional and retain their intended settings, including an example instance of verifying if a firewall continues to restrict network access.

Therefore, it is of utmost importance to generate the right synthetic testing data. While some datasets, often provided by academic institutions such as network traffic logs for device recognition algorithms, can be harnessed for certain tools, they may not always align with a user's specific needs. Moreover, these datasets can become obsolete over time.

Historically, generating synthetic test data has been manual, time-consuming, and not always representative of real-world conditions. Current solutions rely heavily on real customer data or manual simulations using available cybercrime attack tools. However, these methods are limited by potential exposure to sensitive information, lack of representation for edge cases, and rapid obsolescence.

Traditional methods typically have inefficiencies, gaps in coverage, and potential security vulnerabilities. Thus, there is a need in the art for an advanced system and method that harnesses the power of generative AI models, particularly those based on LLMs, for generating comprehensive synthetic test data tailored to specific software testing needs.

SUMMARY

Embodiments described or otherwise contemplated herein substantially meet the aforementioned needs of the industry. The present disclosure relates to systems and methods for generating synthetic test data for testing a software solution. In embodiments, generative AI is leveraged to use a large language model (LLM) to generate synthetic testing data.

In a feature and advantage of embodiments, generative AI simplifies the process of generating synthetic test data and provides a more realistic, comprehensive, and secure testing environment. In one embodiment, the generative AI is based specifically on large language models to mimic real-world data structures and patterns while ensuring privacy, coverage, and control.

In an embodiment, a method of generating synthetic test data for testing a software solution on a computing system comprises receiving a testing task from a user, wherein the testing task is indicative of a software solution to be tested and a type of testing to be performed; identifying test properties of the testing task, including at least one required attribute for synthetic test data; gathering initial information based on the test properties of the testing task; forming a training dataset based on the initial information and the test properties; pretraining a generative AI model based on a large language model (LLM) using the training dataset; configuring synthetic test data based on the test properties; and generating synthetic test data according to the testing task using the generative AI model.

In an embodiment, a system for generating synthetic test data for testing a software solution comprises a hardware processor implemented on a computing device; instructions that, when executed on the hardware processor, cause the computing device to implement: an input module configured to receive a testing task from a user by using an input module, wherein the testing task is indicative of a software solution to be tested and a type of testing to be performed, a data processing module configured to: identify properties of the testing task, by using a data processing module, including at least one required attribute for synthetic test data, gather initial information, by using the data processing module, based on the properties of the testing task, form a training dataset, by using the data processing module, based on the initial information and the test properties, and configure synthetic test data based on a plurality of testing task properties, a generative AI model pretrained based on a large language model (LLM) using the training dataset and configured to generate synthetic test data according to the testing task.

In an embodiment, a method for generating synthetic test data for testing a software solution comprises receiving input data from a user, the input data defining at least one property of the synthetic test data; configuring the synthetic test data properties based on the input data; training an AI model with use-case specific data; and generating synthetic test data using the AI model.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
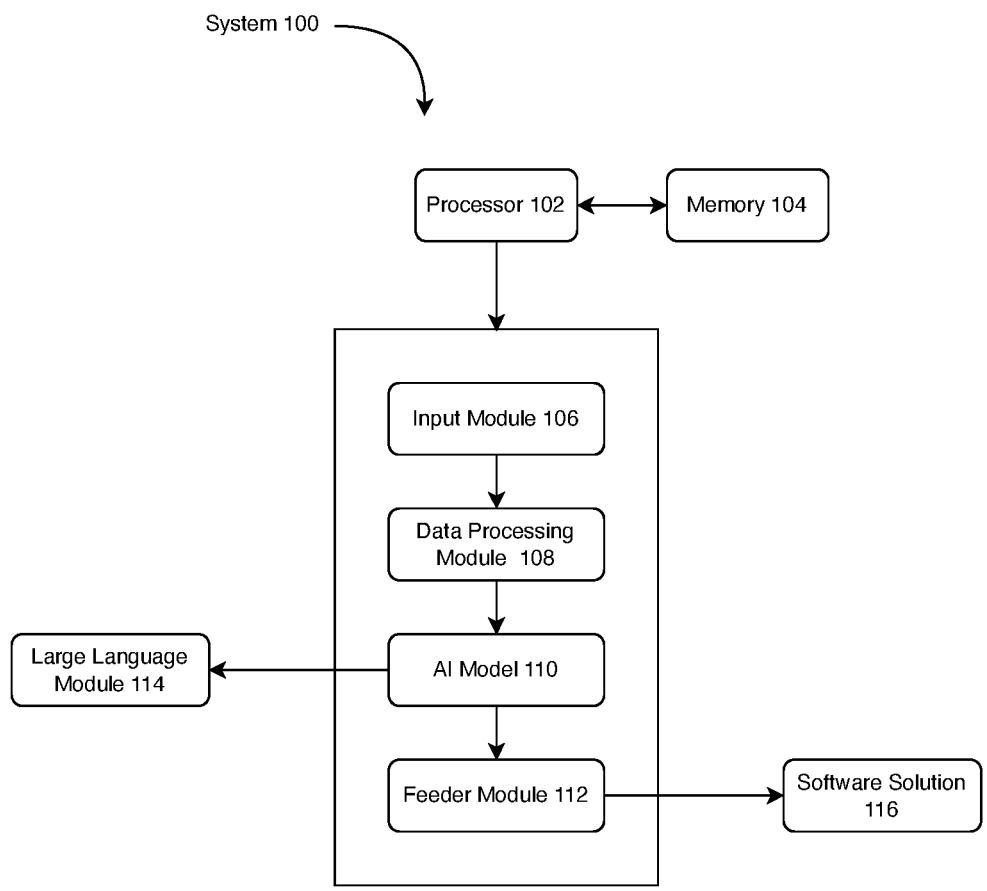
FIG. 1 is a block diagram of a system to generate synthetic test data, in accordance with an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

The present disclosure relates to the field of software testing and, more specifically, to the generation of synthetic data using generative artificial intelligence (AI). The present disclosure describes comprehensive solutions for generating and deploying synthetic test data tailored for specific testing tasks. Embodiments described herein simplify the process of generating test data and provide a more realistic, comprehensive, and secure testing environment.

Referring to FIG. 1, a block diagram of a system 100 to generate synthetic test data is depicted in accordance with one embodiment. The system 100 includes, but may not be limited to, a processor 102, a memory 104, an input module 106, a data processing module 108, an AI model 110, and a feeder module 112. In one embodiment, the system 100 is implemented on a hardware processor 102 and operably coupled to a memory 104.

The processor 102 serves as the central computing unit of the system 100. The processor 102 is configured to manage the operations of all system 100 components and ensures seamless communication between system 100 components. The processor 102 is configured to implement the input module 106, the data processing module 108, the AI model 110, and the feeder module 112. The processor 102 can be a single core or multi-core CPU, optimized for high-speed data processing.

The memory 104 is operably coupled to the processor 102. The memory 104 is configured to store and retrieve data used and generated by the system 100. Such data can include for training datasets, configuration settings, AI model 110s, synthetic test data, and feedback loops. The memory 104 can be a combination of RAM for fast access and non-volatile storage for persistently storing computer readable instructions to operate system 100 components and generated datasets.

In one aspect of the embodiment, the input module 106 serves as the primary interface between the user and the system 100. The input module 106 allows users to input testing tasks, specify configurations, and provide guidance to the generative AI. In one aspect, the testing task specifies the software solution 116 to be tested and the type of testing to be performed. The type of testing to be performed signifies the methodological approach adopted to assess the various attributes of the software. Examples of type of testing includes, but may not be limited to, penetration testing, anti-phishing solution testing, antispam solution testing, EDR solution testing, Extended Detection and Response (XDR) solution testing, antimalware solution testing, data loss prevention (DLP) solution testing, network protection solution testing, URL filter testing, firewall testing, and such other software testing solutions.

As used herein, the term software solution refers to the specific application, program, or system that is the target of the testing process. The software solution encompasses the software product or component that is under scrutiny to ensure its functionality, performance, security, or other attributes. The software solution can include applications, algorithms, platforms, frameworks, or any digital software entity that requires assessment.

The input module 106, in one aspect, can include a graphical user interface (GUI), (not shown in FIG. 1) configured to allow the user to input data. The graphical user interface is alternatively referred to as a configuration interface in the present disclosure. The configuration process is implemented through the configuration interface. The configuration interface allows the user to specify the testing requirements and desired properties, such as the amount of synthetic data, variation levels, and protocol adherence. The interface allows users to guide the data generation process by setting parameters that meet their needs. Users can determine the volume of synthetic data, the diversity of the synthetic data, and ensure the synthetic data adheres to certain protocols or standards. For example, a user can specify the creation of a thousand email samples with varying degrees of malicious content.

In an example, a user might use the input module 106 to specify the requirement of the synthetic data resembling the phishing emails. A user can also utilize the input module 106 to input detail of specific attributes, such as email format, sender patterns, or payload types.

Once the testing task is inputted, the data processing module 108 processes the input data. The data processing module 108 is configured to identify the properties of the task, gather initial information, from existing datasets or specified criteria, and form the training dataset. In one aspect, the data processing module 108 identifies and extracts properties of the task that can include characteristics and attributes pertaining to the synthetic test data. Examples of the properties of the task include the volume of data, variation levels, protocol compliance, and data relevant to configuration, alternatively referred to as the configuration data, of a testing task. In one example, the data relevant to configuration includes data related to sending and receiving entities, such as IP addresses, email accounts, user accounts, timestamps and time interval, or duration of simulated attack, fixed data to be included, i.e., keywords such as "urgent" in phishing emails.

Each testing task is configured with properties that specifies objectives of the software solution 116 testing and the targeted environment for testing. Examples of the objective of software testing may include, but may not be limited to, stress testing, vulnerability scanning, or functionality verification. In one implementation, the synthetic data is generated using these objectives. According to an aspect, the targeted environment for testing indicates whether the test is for a production environment, a staging set-up, or a specific OS or device. The system 100 ensures that the generated data is pertinent to the target environment of testing.

The data relevant to the configuration set up allows the user to select the size of data or traffic that the user wants to be generated. The user can tailor the configuration data to dictate the extent of variations the AI model 110 should apply to the existing traffic. With the appropriate configuration data, the AI model 110 can also select between adherence to protocol standards or opting for 'fuzzing', where the system 100 might produce data that potentially disrupts or crashes target system 100, based on the variation. For instance, variations can be the changes made to the content, size, format, or even individual bytes of an image file. Users can also set the system 100 to periodically generate data at specified intervals. The configuration further allows users to designate the method and location for data output, be it saving to specific folders as static files, streaming to messaging queues, storing in databases, or interfacing with APIs.

Additionally, the configuration data indicates whether the AI model 110 should be refined using locally-gathered data. Refining using locally-gathered data means that the data collected can be utilized to generate new embeddings for the Large Language Model (LLM 114) powering the AI model 110. By doing this, the AI model 110 can better grasp the unique nuances of the organizational structure in which the software solution 116 is deployed and thereby generate more realistic data. Furthermore, using locally-gathered data allows the AI model 110 to better comprehend proprietary protocols that might not have been in its original training data.

In one aspect, the data processing module 108 is configured to gather initial information by retrieving and collecting data from initial data sources based on the properties of the testing task. The initial data sources are the data sources configured to provide data required to process the testing task. In few examples, the data sources of initial information can include streams of transaction data, emails from honeypot email accounts, human resources data, log data, log files from process activities or message streams from SIEM solutions, web security data, web protocols data, or system 100 data logs. In one aspect, the initial information can be unlabeled, labeled, or mixed. For example, the initial information can be labeled as malicious, benign, or spam, phishing, malware, clean, and such. Another example of gathering the initial information includes collecting files from sandbox system 100 (or other implementations of system 100) or from detections on endpoints, such as files from email attachments.

According to one implementation, the initial information is collected from existing data sources, such as existing system 100 data, current threat data, and software-specific threat information as a template or guide. Use of existing data sources ensures that the generated synthetic data mirrors real-world threats and system 100 interactions. Incorporating hardware specifications, operating system (OS) settings, and software configurations ensures the synthetic data is tailored specifically to the system 100 or software being tested. More particularly, such incorporation of the aforementioned data makes the test scenarios realistic. By understanding patterns like browsing habits, application usage, and user reactions, embodiments can generate synthetic data that can closely mimic real-world user interactions, adding another layer of realism to the testing environment. In another aspect, additional initial information or datasets can be collected to enhance the diversity and realism of the synthetic test data from the data sources, such as external threat intelligence feeds or user behaviour analytics. Types of additional initial information may include, but may not be limited to, actual malware binary files, malicious scripts such as powershell or visual basic, malicious documents, such as Word or PDF with embedded malware, sensitive files (e.g. for the DLP test), malicious URLs from phishing emails or other malicious websites, or behavior of an executed process on a system 100, such as the behavior of a malware like writing files, creating registry keys or accessing the network.

In an aspect, the data processing module 108 is further configured to form a training dataset. Based on the properties of the testing task and gathered initial information, the data processing module 108 curates the training dataset tailored to optimize the performance of AI model 110. The training dataset is a comprehensive dataset that represents the characteristics and variations needed for the synthetic test data generation. In one aspect, the training dataset can be structured data, such as relational database files, spreadsheets, key-value pairs, and the like. In another aspect, the training dataset can be unstructured data, such as character strings, tokens, and the like. In another example, the training dataset can include both structured and unstructured data. In one example, the training dataset can include numerical data representing a social security number. In another example, the training dataset can include a character string, such as "urgent", "from the Government", or any such string that can be interpreted as inducing undue influence on the user to give up critical information. In another embodiment, the training dataset can include multiple types of data.

In an embodiment, the system 100 further includes the AI model 110 based on a large language model (LLM 114) that was pretrained with different log files, network traffics, emails and other data structures.

The AI model 110, grounded in a large language model (LLM 114) architecture, is configured for generating synthetic test data. The AI model 110 utilizes the training dataset, along with guidance or configuration data provided by the user (if there is any, e.g. as received by the input module 106), to generate variations of test data that align with the user's requirements. The AI model 110 has the capability to be pretrained or fine-tuned, based on feedback loops or new training data. For example, if the task is generating phishing emails, the AI model 110 takes the dataset containing phishing email patterns and then creates variations, altering subject lines, payloads, or email bodies, producing synthetic phishing emails that look authentic.

The generative AI model 110 undergoes preliminary training with a broad and varied dataset encompassing log files, network traffic, emails, and other pertinent data types. Thus, the AI model 110 exhibits the capability to recognize multiple data formats and generate more realistic synthetic test data.

In one aspect, when specified, the AI model 110 takes existing data and combines it with configuration settings to produce augmented data or traffic. For instance, suppose the provided data comprises emails with phishing content, the AI can then create varied versions of this email content. Similarly, using process trees detailing parent-child relationships, frequently outputted by EDR solutions, the AI model 110 can yield up to a hundred thousand unique variations, each with distinct processes and timestamps. Users can interactively direct the AI model 110 using natural language commands (e.g. via the input module 106), allowing them to determine specifics like the time range for the synthetic data or other nuances not pre-set in the configurations. Once generated, this data can be saved to individual files in a directory, channeled into streaming and messaging system 100, stored in databases, or even made accessible via APIs.

In accordance with one aspect, testing tasks can be categorized into various simple groups for testing purposes. In one example, three primary groups can be formed for classification. The primary groups can include network traffic tests, file-based tests, and behavioral sequence tests. Each category can have a default data collection method. For network tests, the default data collection method can mean capturing network packets. For file-based tests, the default data collection method can entail obtaining the problematic file. Further, for behavior sequence tests, the default data collection method can require documenting a series of events, like the actions of a process. The AI model 110 can efficiently classify the test cases based on its initial training, where it learned the necessary data collection techniques for scenarios like emails.

In one implementation, the testing task can be configured to be performed automatically. The synthetic test data is automatically integrated into the testing pipeline of the software solution 116, enabling continuous and scalable testing efforts without manual intervention. When generated synthetic data is seamlessly integrated into the pipeline, the system 100 or the user has the ability to offer feedback regarding notable data or traffic patterns. For instance, if certain synthetically-generated phishing emails evade detection, such emails can be marked for future retesting. Similarly, if a particular input file causes the application to malfunction, the file should be incorporated into the quality assurance (QA) testing regimen. By saving these crucial data instances with their respective markers, the system 100 can prioritize such crucial data instances for inclusion in subsequent tests.

In another implementation, the testing task can be configured to be performed manually. While automation drives efficiency, human expertise and oversight can add a layer of validation and nuance. Manual processing implies that once synthetic data is generated, human experts can review, modify, or curate it, potentially identifying nuances or issues automated system 100 might overlook. Manual intervention adds an additional layer of quality assurance, ensuring the synthetic data meets all required benchmarks.

Determining the property for data generation can start with default configurations followed by a feedback mechanism. For instance, after dispatching a test, like a phishing email, the system 100 can evaluate its detectability. If flagged or blocked, the AI model 110 can iteratively modify its approach by adjusting settings. In another aspect, the system 100 can be configured for integrating external threat intelligence feeds with AI model 110. Such feeds can provide real-time information about emerging threats, like identified phishing emails or new malware strains. These externally sourced threats can then be used as templates for the synthetic data generation process. In one aspect, the feedback loop enables the system 100 or user to provide feedback on interesting data or traffic, such as cases that need to be retested or scenarios that should be added to the QA testing process.

In one aspect, the AI model 110 can be retrained based on the properties of the task. Adaptability and refinement of the AI model 110 are vital characteristics of the generative AI model 110. Each testing task is configured with a specific set of requirements and characteristics. For instance, if the task is to test a spam filter, the properties might include the frequency of certain words, such as a word "urgent" is repeated for more than 10 times in an email body of 150 words, the structure of the email, such as with numerous signs indicating potential harm if the user do not abide by the instructions given in the email, or even the presence of malicious links, such as the email address pretends to belong to a government organization but the link nowhere contains the government domain name. Using these properties, the AI model 110 can be more aptly guided towards generating realistic and relevant test data.

In another aspect, the retraining is subject to a feedback loop about synthetic test data. The feedback loop mechanism enables the AI model 110 to gauge the effectiveness of the generated test data. Feedback can be derived from how well the synthetic data performed in the tests, any anomalies detected, or from human experts reviewing the data. This feedback is then used to make iterative improvements to the model, ensuring that subsequent data generation is closer to the desired output.

In one aspect, the generated data is validated for its quality and reliability based on the testing task requirements. A validation process ensures that the data can reliably simulate real-world scenarios and conditions with adequate accuracy. For validation, a predefined criteria can be set. The predefined criteria can be a set of benchmarks of standards that the synthetic test data must meet. For instance, if the synthetic data is meant to mimic user behavior on a website, the criteria can include realistic time intervals between clicks, the sequence of pages visited, or the variety of user agents and devices. Once the synthetic test data is generated, the synthetic data can be compared against the predefined criteria. In one implementation, the validation is an automated process configured to implement algorithms that assess the data for its adherence to the predefined standards. In another implementation, the validation process involves manual quality checks. For example, if the synthetic test data meets the predefined criteria, the generated data is said to be validated and ready to be used. If not, the feedback from the validation process can be fed back into the AI model 110 to refine its data generation capabilities, reinforcing the importance of the feedback loop.

In one aspect, the system 100 is further configured to implement data anonymization processes during synthetic data generation. As described herein, addressing the challenges related to privacy concerns and data regulations is of utmost importance. Ensuring data privacy, even for synthetic data, is paramount. Anonymization guarantees that any resemblance of the data to real-world entities cannot be traced back to an individual. Examples of anonymization techniques include, but are not limited to, tokenization, masking, or perturbation application. These techniques ensure that the synthetic data, even if derived from real datasets, remains non-identifiable.

The anonymization process begins by defining specific anonymization rules and settings at the outset. Users can establish these rules to dictate how sensitive information is treated during data generation. For instance, a user may specify that all instances of certain names, such as 'DAVE,' should be replaced with randomly generated usernames, like 'USER2,' as per predefined settings. Alternatively, the embodiments can employ sophisticated AI-driven techniques to identify potentially sensitive data elements within the dataset. AI-driven techniques can analyze text strings to detect patterns resembling usernames, IP addresses, or other confidential information. Generative AI can then intelligently replace these sensitive elements with non-identifiable placeholders. This dynamic approach allows the system 100 to adapt to varying data types and structures, making it highly versatile and robust in ensuring data privacy. In practice, embodiments can operate as a hybrid solution, seamlessly combining both static rule-based anonymization and AI-powered identification and substitution methods. Such flexibility not only enhances data privacy but also ensures compliance with evolving data protection regulations.

The feeder module 112 interfaces with the software solution 116 under test. Once synthetic test data is generated, the feeder module 112 feeds the synthetic data into the software solution 116, thereby simulating real-world data input. Depending on user configuration, the feeder module 112 can replay historical data, inject real-time synthetic data, or perform a mix of both.

In an embodiment, the feeder module 112 can annotate certain data. For example, if the data is used automatically for the pipeline then the system or user can provide feedback about interesting data or traffic. More particularly, if some generated phishing emails are not detected as malicious, those emails can be flagged as cases that should be tested again in the future. In another example, if a specific input data file crashed the application, then this input can be added to the QA testing process. These data points with associated tags can be saved, so that the system includes the data in future testing.

According to the embodiment, the system 100 of the present disclosure is at least partially embodied in the form of computer-implemented processes and apparatus for practicing those processes. The disclosed methods are also at least partially embodied in the form of tangible, non-transitory machine-readable storage media encoded with computer program code. The media can include, for example, RAMs, ROMs, CD-ROMs, DVD-ROMs, BD-ROMs, hard disk drives, flash memories, or any other non-transitory machine-readable storage medium, wherein, when the computer program code is loaded into and executed by a computer, the computer becomes an apparatus for practicing the method. When implemented on the processor 102, the computer program code segments configure the processor 102 to create specific logic circuits. The methods can alternatively be at least partially embodied in a digital signal processor 102 formed of application specific integrated circuits for performing the methods.

Any of the modules and components depicted as being operated by the processor 102 can include any combination of software, firmware, and/or hardware. The software and/or firmware can include computer-executable code, instructions, or the like that can be loaded into the memory 104 for execution by one or more of the processor 102(*s*). Any of the components depicted as being stored in data storage can support functionality described in reference to correspondingly named components earlier in this disclosure.

The processor(s) 102 can be configured to access the memory 104 and execute computer-executable instructions loaded therein. For example, the processors 102 can be configured to execute computer-executable instructions of the various program component(s), applications, engines, or the like of the computing device to cause or facilitate various operations to be performed in accordance with one or more embodiments of the disclosure. The processor(s) can include processing units including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor 102 (DSP), and so forth. Further, the processor(s) can have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) can be capable of supporting any of a variety of instruction sets.

System 100 can include alternate and/or additional hardware, software, or firmware components beyond those described or depicted without departing from the scope of the disclosure. More particularly, it should be appreciated that software, firmware, or hardware components depicted as forming part of the computing device are merely illustrative and that some components can not be present or additional components can be provided in various embodiments. While various illustrative program component(s) have been depicted and described as software component(s) stored in data storage, it should be appreciated that functionality described as being supported by the program component(s) can be enabled by any combination of hardware, software, and/or firmware. It should further be appreciated that each of the above-mentioned component(s) can, in various embodiments, represent a logical partitioning of supported functionality. This logical partitioning is depicted for ease of explanation of the functionality and can not be representative of the structure of software, hardware, and/or firmware for implementing the functionality. Accordingly, it should be appreciated that functionality described as being provided by a particular component can, in various embodiments, be provided at least in part by one or more other component(s). Further, one or more depicted component(s) may not be present in certain embodiments, while in other embodiments, additional component(s) not depicted can be present and can support at least a portion of the described functionality and/or additional functionality. Moreover, while certain component(s) can be depicted and described as sub-component(s) of another component, in certain embodiments, such component(s) can be provided as independent component(s) or as sub-component(s) of other component(s).

In an aspect, the communication between the user and the system 100 can be facilitated through a communication network. The network can include certain communication protocols, such as TCP/IP, http, https, ftp, and sftp protocols, over one or more communication networks. The communication network can be but is not limited to, internet, intranet, wide area network (WAN), local area network (LAN), wireless network, Bluetooth, WiFi, and a mobile communication network. A user computing device can be utilized by users of the system 100 to interact with (e.g., send or receive electronic messages to and from via the input module 106) the system 100 through the network. In some embodiments, the user computing device is a mobile/hand-held device, such as a tablet, iPhone, iPad, Google's Android device, and/or other types of mobile communication device, PC, such as laptop PC and desktop PC, or a server machine.

Figure 2:
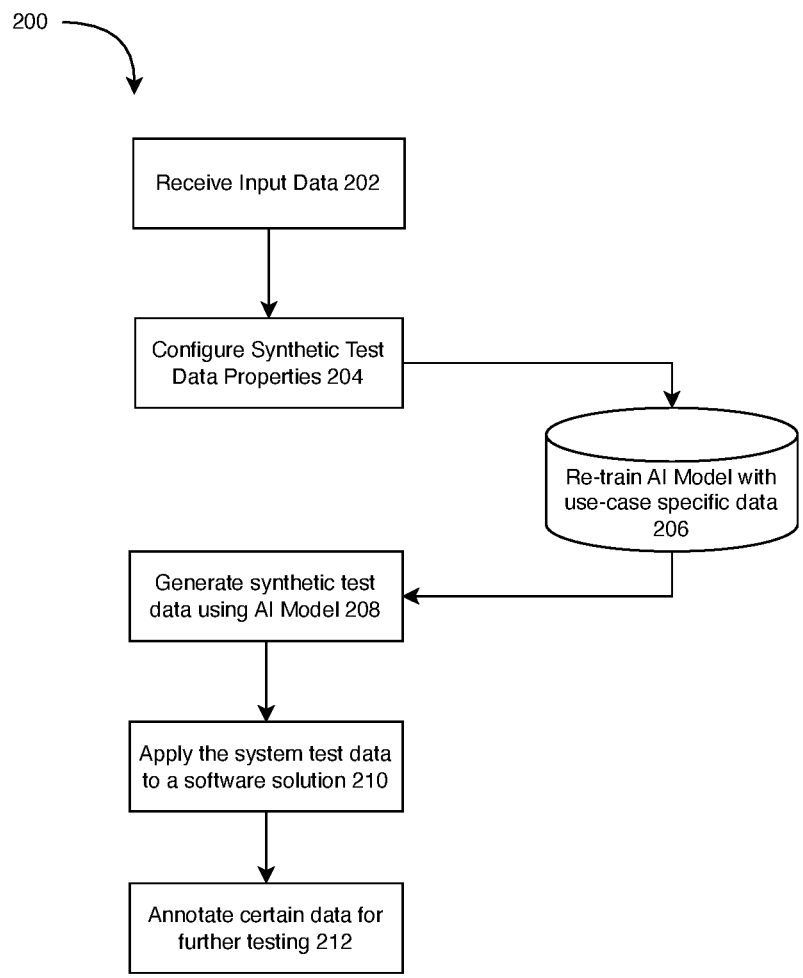
FIG. 2 is a flowchart of a method for generating synthetic test data, in accordance with an embodiment.

Referring to FIG. 2, a flowchart of a method 200 for generating synthetic test data is depicted, according to an embodiment. Method 200 includes receiving input data, at block 202. The input data can be received from a user through a configuration interface implemented on a computing system 100 or a computing system 100 configured to perform automatic testing. The input data can include testing tasks, specification of configurations, and guidance to the generative AI (e.g. the AI model 110). The testing task indicates the specific software solution 116 that needs testing and the type of testing to be executed.

At block 204, method 200 further includes configuring synthetic test data properties. For example, the data processing module 108 of the system 100 configures a synthetic test task based on test data properties. The configuration includes identifying and extracting the necessary characteristics and attributes for the synthetic test data based on the user's inputted task. The configuration can also include gathering initial information based on the test properties of the testing task, and forming a training dataset based on the initial information and the testing task properties. An AI model such as AI model 110 is configured to receive the configuration data to generate the synthetic test data.

At block 206, the AI model is retrained with use-case specific data. For example, AI model 110 can be re-trained with use-case specific data. The AI model 110 can be retrained based on the properties of the task.

At block 208, the AI model generates synthetic test data. For example, the AI model 110 is configured to generate synthetic test data for the given testing task. The AI model 110, built upon the foundation of a Large Language Model (LLM 114) framework, produces synthetic test data based on the testing task properties. Leveraging the training dataset and any user-provided guidance or configuration inputs, the AI model 110 crafts diverse test data variants that match the user's specifications.

At block 210, the generated synthetic test data is then applied to a software solution to be tested. For example, the synthetic test data generated by the AI model 100 can be input by the feeder module 112 to the software solution 116.

At block 212, certain data from the generated data is annotated for further testing. For example, the feeder module 112 can annotate particular data.

Figure 3:
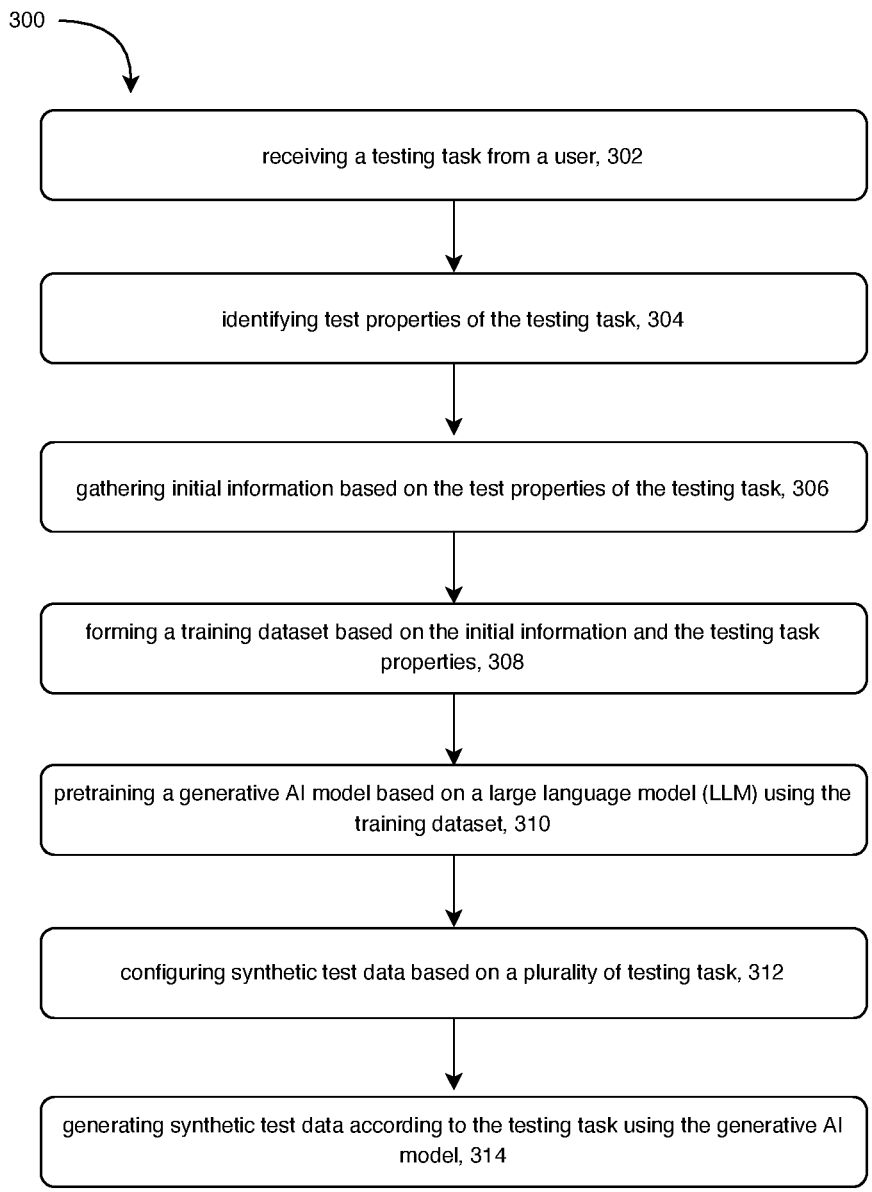
FIG. 3 is a flowchart of a method for generating synthetic test data, in accordance with an embodiment.

Referring to FIG. 3, a method 300 of generating synthetic test data for testing a software solution on a computing system is depicted, in accordance with the present embodiment. For example, the method 300 can be utilized for generating synthetic test data for testing the software solution 116.

At 302, the method 300 includes receiving a testing task from a user. The testing task is indicative of a software solution 116 to be tested and a type of testing to be performed. The testing task specifies the specific software solution 116 that the user intends to test. Moreover, the task provides specifications regarding the kind or type of testing that the user desires to perform. Such a task helps in shaping the subsequent operations and ensures the generation of synthetic test data that is both relevant and purposeful.

At 304, the method 300 includes identifying test properties of the testing task, including the required characteristics and attributes for synthetic test data. The test properties indicate the vital characteristics and attributes necessary for the generation of synthetic test data.

At 306, the method 300 includes gathering initial information based on the test properties of the testing task. The initial information corresponds to the test properties identified in 304. By amalgamating this data, the system 100 lays a foundational bedrock upon which the synthetic test data will be built.

At 308, the method 300 includes forming a training dataset based on the initial information and the testing task properties. The training dataset is formulated by collecting vast data from various sources, including existing databases and external threat bases.

At 310, the method 300 includes pretraining a generative AI model such as the AI model 110 based on a large language model (e.g. LLM 114) using the training dataset. At 310, AI model 110 learns and adapts to the nuances of the dataset, ensuring that AI model 110 is equipped to produce synthetic test data that is as close to real-world data as possible.

At 312, the method 300 includes configuring synthetic test data based on a plurality of testing task properties. The test configurations are based on the various properties of the testing task. The configurations act as instructions for test data generation, ensuring that the generated data aligns well with the user's requirements and the specifics of the testing task.

At 314, the method 300 includes generating synthetic test data according to the testing task using the generative AI model 110. With preliminary training and the specific configurations set, the AI model 110 creates data that mimics real-world data, catering specifically to the testing task provided by the user.

In one aspect, the method 300 includes feeding the synthetic test data into the computing system 100.

Optionally, though not depicted in FIG. 3, the generative AI model 110 can be re-trained based on use-case specific data.

The invention claimed is:

1. A method of generating synthetic test data for testing a software solution on a computing system, the method comprising:
   receiving a testing task from a user, wherein the testing task is indicative of a software solution to be tested and a type of testing to be performed;
   identifying test properties of the testing task, including at least one required attribute for synthetic test data;
   gathering initial information based on the test properties of the testing task;
   forming a training dataset based on the initial information and the test properties;
   pretraining a generative AI model based on a large language model (LLM) using the training dataset;
   configuring synthetic test data based on the test properties; and
   generating synthetic test data according to the testing task using the generative AI model.

2. The method of claim 1, further comprising feeding the synthetic test data into the computing system.

3. The method of claim 1, further comprising generating a feedback loop about the synthetic test data for retraining of the generative AI model.

4. The method of claim 3, further comprising retraining the generative AI model based on the test properties, the initial information, and the feedback loop.

5. The method of claim 1, further comprising validating the generated synthetic test data against predefined criteria.

6. The method of claim 1, further comprising implementing data anonymization processes during synthetic data generation.

7. The method of claim 1, wherein the initial information comprises at least one of:
- existing data of the computing system, existing threat data,
- relevant threat data associated with the software solution,
- system configuration data including hardware specifications, operating system settings, software configurations,
- user behavior data including browsing patterns, application usage, and response to various stimuli.

8. The method of claim 1, wherein the testing task properties include at least one objective of the software solution testing and the targeted environment for testing.

9. The method of claim 1, wherein the configuring is implemented through a configuration interface wherein the user specifies at least one of a synthetic data property, synthetic data variation level, or protocol adherence through the configuration interface.

10. A system for generating synthetic test data for testing a software solution, comprising:
- a hardware processor implemented on a computing device;
- instructions that, when executed on the hardware processor, cause the computing device to implement:
  - an input module configured to receive a testing task from a user by using an input module, wherein the testing task is indicative of a software solution to be tested and a type of testing to be performed,
  - a data processing module configured to:
    - identify properties of the testing task, by using a data processing module, including at least one required attribute for synthetic test data,
    - gather initial information, by using the data processing module, based on the properties of the testing task,
    - form a training dataset, by using the data processing module, based on the initial information and the test properties, and
    - configure synthetic test data based on a plurality of testing task properties,
  - a generative AI model pretrained based on a large language model (LLM) using the training dataset and configured to generate synthetic test data according to the testing task.

11. The system of claim 10, wherein the instructions that, when executed on the hardware processor, cause the computing device to further implement a data feeder module configured to supply the synthetic test data to the computing system.

12. The system of claim 10, wherein the AI model is further configured to receive feedback and retrain based on the feedback.

13. The system of claim 10, wherein the data processing module is further configured to validate the synthetic test data against predefined criteria.

14. The system of claim 10, wherein the data processing module is further configured to collect at least one of:
- existing data of the computing system, existing threat data, relevant threat data associated with the software solution;
- system configuration data including hardware specifications, operating system settings, software configurations;
- user behavior data including browsing patterns, application usage, and response to various stimuli.

15. The system of claim 10, wherein the input module is further configured to receive user-defined properties including amount of synthetic data, variation levels, and protocol adherence.

16. The system of claim 10, wherein the AI model is further configured to perform data anonymization process during synthetic data generation.

17. The system of claim 10, wherein the input module is further configured to identify testing task properties including at least one objective of the software solution testing and the targeted environment.

18. The system of claim 10, wherein the data processing module collaborates with the AI model to maintain properties of synthetic test data.

19. The method of claim 2, wherein the synthetic test data disrupts the computing system.

20. The system of claim 11, wherein the synthetic test data disrupts the computing system.

* * * * *